United States Patent
Richards

(10) Patent No.: US 6,551,382 B1
(45) Date of Patent: Apr. 22, 2003

(54) HOT-HUMID/COLD GAS SCRUBBING PROCESS AND APPARATUS

(76) Inventor: Clyde N. Richards, 4887 Mission Blvd., San Diego, CA (US) 92109

(*) Notice: Subject to any disclaimer, the term of this patent is extended or adjusted under 35 U.S.C. 154(b) by 0 days.

(21) Appl. No.: 10/155,528

(22) Filed: May 24, 2002

(51) Int. Cl.$^7$ ............................... B01D 47/06
(52) U.S. Cl. ............... 95/66; 95/71; 95/199; 95/224; 95/227; 95/228; 96/50; 96/53; 96/242; 96/266
(58) Field of Search ............ 95/199, 200, 202, 95/224, 227, 228, 71, 66; 96/242, 266, 271, 273, 322, 50, 53

(56) References Cited

U.S. PATENT DOCUMENTS

| | | | |
|---|---|---|---|
| 2,280,633 A | * | 4/1942 | Crawford |
| 2,367,695 A | * | 1/1945 | Spiselman |
| 2,598,116 A | * | 5/1952 | Du Bois |
| 2,849,083 A | * | 8/1958 | Nelson et al. |
| 2,858,903 A | | 11/1958 | Goetz et al. |
| 3,232,029 A | * | 2/1966 | Evans, Jr. |
| 3,899,308 A | | 8/1975 | Petersson |
| 4,193,774 A | | 3/1980 | Pilat |
| 4,345,916 A | | 8/1982 | Richards et al. |
| 4,574,062 A | * | 3/1986 | Weitman |
| 4,957,512 A | | 9/1990 | Denisov et al. |
| 5,147,423 A | | 9/1992 | Richards |
| 5,176,723 A | * | 1/1993 | Liu et al. |
| 5,567,215 A | * | 10/1996 | Bielawski et al. |
| 5,792,238 A | | 8/1998 | Johnson et al. |
| 5,941,465 A | | 8/1999 | Richards |
| 6,110,256 A | | 8/2000 | Reynolds et al. |
| 6,156,098 A | | 12/2000 | Richards |

* cited by examiner

Primary Examiner—Duane S. Smith
(74) Attorney, Agent, or Firm—Robert W. Harris

(57) ABSTRACT

Effluent gas cleaning process and apparatus for effectively removing particulates in the 0.01 micron to 0.1 micron diameter range, and for removing water-soluble gaseous contaminants, by first bringing the effluent to a relatively high temperature and humidity in a first stage, and then exposing the effluent to copious quantities of small cool water droplets in a second stage, for particular combinations of: the first stage relative humidity; the first-to-second stage droplet temperature difference; the stage two water droplet mass flow rate vs. effluent flow rate; the second stage droplet size; the travel time of the effluent during exposure to the cool droplets; and the electrical charge state of the second stage water droplets and opposite charge state of the particulates. The combinations enhance effluent cleaning through the combined operation of up to four distinct physical processes which can be made to occur during the second stage.

20 Claims, 2 Drawing Sheets

HOT-HUMID/COLD GAS SCRUBBING PROCESS AND APPARATUS

BACKGROUND OF THE INVENTION

The invention pertains to gas cleaning processes for removing contaminant gases and particulates from air, and more particularly to a process combining the operation of several distinct physical processes, together in one overall process, in which the distinct physical processes work together to optimize the cleaning from an effluent gas of contaminant particulates in the 0.01 micron to 0.1 micron diameter size range, as well as water-soluble contaminant gases. The field of application of the present invention process includes cleaning air of such particulates and water soluble toxic gases introduced into air by numerous industrial processes, particularly high temperature processes, as well as scrubbing of bacteriological agents from air, including viruses, bacteria, and spores including anthrax.

Although contaminants introduced into air by high temperature industrial processes are often initially of molecular size, upon cooling via mixing with ambient air or with cleaning water sprays some of such molecules rapidly condense to form clusters of molecules which in turn coagulate to form contaminant particulates in the size range from 0.01 micron to 0.2 micron diameter and larger.

Natural processes are generally ineffective in removing such particulates, as evidenced by the fact that the size distribution of the particulates found in "clean" air has a maximum at about 0.02 microns diameter.

Although particulates in the size range from 0.01 micron to 0.2 micron usually represent only a small fraction of the total mass of particulates entering the atmosphere from industrial processes, such particulates can produce a significant opacity of the emitted plume, readily detected by emissions monitoring by environmental regulatory agencies, and can also affect the radiative heating and cooling of the atmosphere.

It has long been known in the gas cleaning arts, to clean an effluent gas of contaminants both in the form of particulates and water-soluble gases, by a variety of processes, including exposing the gas to copious quantities of water droplets which are subsequently collected by various means; and/or by using a means to charge the particulates if they are not already charged, and using charged droplets of charge polarity opposite to that of the particulates to collect the particulates; and/or by using electrostatic precipitating means to collect charged particulates and/or charged droplets; and/or by humidifying, cooling and supersaturating air containing particulates to allow condensation and growth of water droplets upon particulates serving as condensation nuclei. Such approaches are disclosed in numerous prior patents, including applicant's prior patents and patents cited therein. See, e.g., patents cited in applicant's own prior U.S. Pat. Nos. 6,156,098; 5,941,465; 5,147,423; and 4,345,916.

It is also known in the art, as disclosed in applicant's U.S. Pat. No. 6,156,098, to use very highly charged water droplets in cleaning even uncharged particulates from an effluent gas, by invoking the monopole-dipole electrostatic attraction force which exists between a highly charged droplet's monopole charge and the electric dipole induced by the droplet monopole in a nearby uncharged particulate, to draw the particulate and droplet together; and to use such charged droplets in collection of oppositely charged particulates.

Prior art approaches have had varying success for different particulate size ranges of particulates to be cleaned from an effluent gas. A difficult size range for achieving high collection efficiency has been the 0.01 micron to 0.1 micron diameter particulate size range.

There is a need, met by the present invention as detailed below, for a process invoking additional individual physical processes, in a combination not found to applicant's knowledge in the prior gas cleaning art, to achieve highly efficient particulate gas cleaning in this relatively difficult 0.01 micron to 0.1 micron diameter size range.

And there is a need, also met by the present invention as detailed below, for specification of suitable operating parameters for the process, which will allow the process to achieve optimal results for that particulate diameter size range.

These needs are met in the present invention, by a two stage process in which the effluent gas is in the first stage brought to a high relative humidity and relatively high temperature, and then in a second stage exposed to copious quantities of cool water droplets, which have a substantial charge opposite to any particulate charge polarity, as detailed below, in such a manner as to invoke several distinct processes occurring in the second stage that can be made to cooperate, to enhance the particulate collection efficiency of the droplets.

These second stage processes, discussed in detail below, include first a thermo-phoretic effect, consisting of a thermophoretic force, exerted on particulates near the cool droplets, urging the particulates toward the droplets; a diffusiophoretic effect, consisting of a diffusio-phoretic force, exerted on particulates near the droplets, also urging the particulates toward the droplets; and a condensation effect, whereby the cool droplets may cause the particulates to act as water condensation nuclei. Although these effects have not previously been invoked together in the gas cleaning arts to applicant's knowledge, the physics of both the thermophoretic effect and the diffusio-phoretic effect were long ago explicated by Albert Einstein, in *Physikalische Zeitschrift*, Vol. 27, p. 1 et seq (1924).

As further detailed below, with a suitable combination of operating parameters, all three of these second stage processes may be made to act in concert to increase the particulate collection efficiency of the stage two cold water droplets.

SUMMARY OF THE INVENTION

The invention is an effluent gas cleaning process for removing varied kinds of particulates with high efficiency for particulates in the 0.01 micron to 0.1 micron diameter range, and for removing water-soluble gaseous contaminants, by first bringing the effluent gas to a relatively high temperature and humidity in a first stage, and then exposing the effluent gas to copious quantities of small cool charged water droplets in a second stage, which process is optimally carried out for particular combinations of the following operating parameters: the first stage relative humidity, being preferably greater than 95%; the temperature difference, between the first stage and the cool second-stage water droplets, being preferably at least 15 deg. F.; the stage two cool water droplet mass flow rate, being preferably at least equal to the effluent gas mass flow rate; the second stage cool water droplet diameter, being preferably being no larger than 200 microns; the second stage cool water droplets having an electrical charge, which is preferably is at least an appreciable portion of the theoretical maximum charge which may be carried by the droplets; the effluent having a travel time of preferably at least 2 seconds during exposure to the second stage cool droplets; and the particulates preferably having an electric charge, of opposite polarity to that of the second stage cool droplets. These combinations enhance effluent cleaning through the combined operation of up to four distinct physical processes which can occur during the second stage. Different embodiments of the invention involve varying combinations of said operating parameters, as recited in the claims.

DESCRIPTION OF THE PREFERRED EMBODIMENTS

Figure 1:
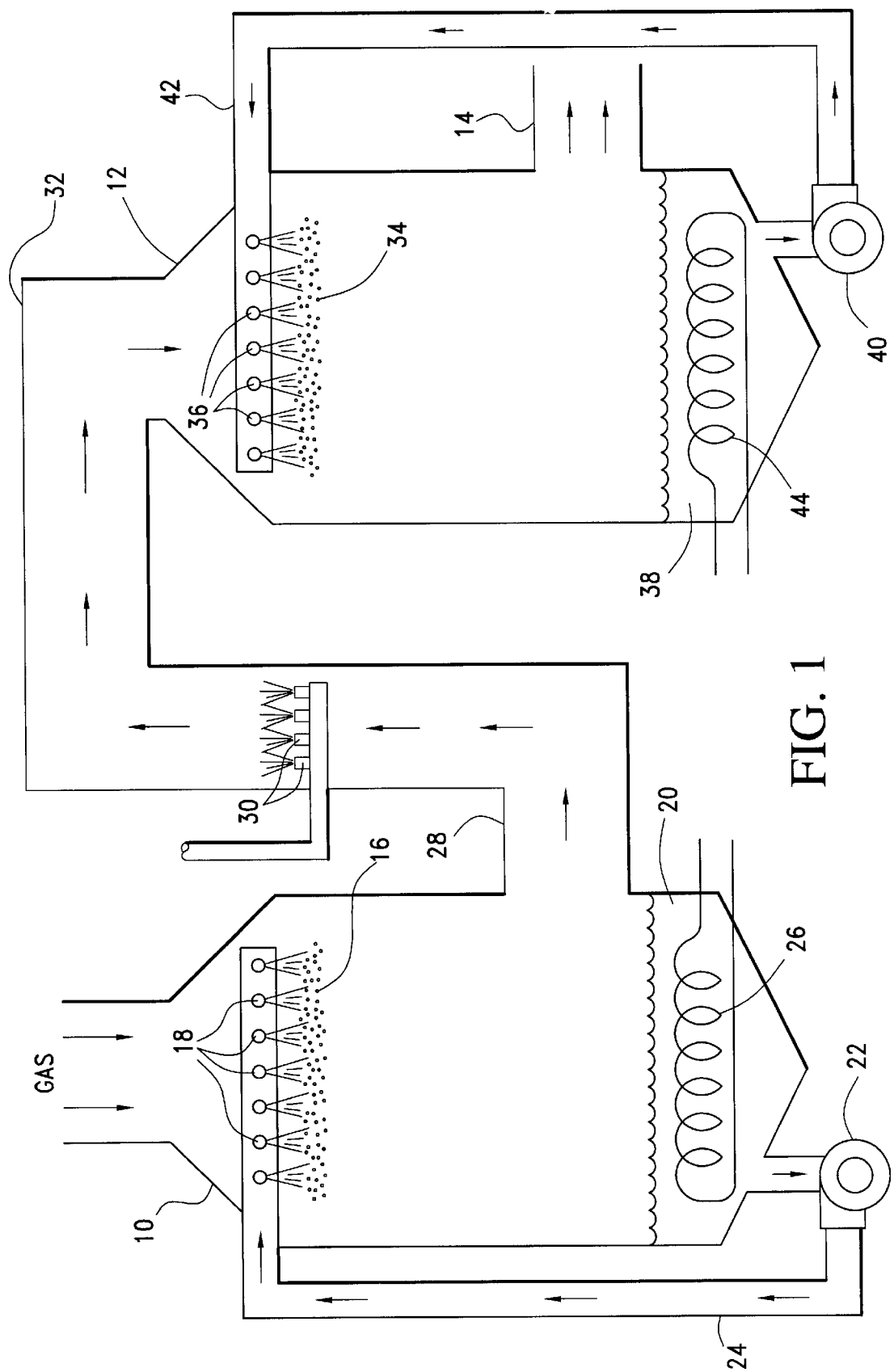
FIG. 1 is a vertical cross sectional view of an apparatus suitable for carrying out the process of the present invention.

Referring now to the drawings, in which like reference numbers denote like or corresponding elements, FIG. 1 illustrates a suitable apparatus for carrying out the process of the present invention. The effluent gas to be cleaned is first passed through chamber 10 and then through chamber 12 by means of an induced draft fan (not shown) downstream of the gas exhaust port 14 of chamber 12.

As the gas enters chamber 10, it is brought into intimate contact with copious numbers of small warm liquid droplets 16 which emanate from a nozzle array 18. The liquid which comprises the warm liquid droplets 16 is drawn from sump 20 and delivered to the nozzle array 18 via liquid pump 22 and pipe 24. The liquid in sump 20 is heated by heat exchange coils 26 which are maintained at high temperature by passing steam or hot water through them.

After passing through chamber 10, the effluent gas exits through exhaust port 28, while the liquid droplets 16 fall to sump 20.

After exiting exhaust port 28 of chamber 10, the effluent gas passes through an array of steam nozzles 30 in duct 32 which eject and mix low-grade steam (from a source not shown) into the gas, to further increase both the humidity and temperature of the effluent gas.

The effluent gas is then conducted via duct 32 into the top of chamber 12, where it is thoroughly mixed with a copious number of cool liquid droplets 34, emitted from a nozzle array 36. The liquid comprising cool droplets 34 is drawn from sump 38 and delivered to nozzle array 36 via pump 40 and pipe 42. The liquid sump 38 is cooled by heat exchange coils 44 which are maintained at a low temperature by circulating a cool liquid through them.

As the cool liquid droplets 34 emanate from nozzle array 36 and are mixed with the warm, humid gas which enters chamber 12, the particulates and soluble gases are driven toward, and collected by, the cool liquid droplets 34, through the processes discussed in detail below; the liquid droplets 34 then fall into sump 38 while the gas exits chamber 12 via exhaust port 14. The collection efficiency of the cool liquid droplets 34 is further enhanced if they are highly electrically charged, with a charge opposite to any charge borne by the particulates contained in the effluent gas, as also further discussed below.

Qualitative Explication of Physical Processes Occurring in Operation of Present Invention Process When the present invention process is carried out with an optimal choice of operating parameters, detailed below, the physics of the particulate collection efficiency enhancement achieved by the present invention process may be understood qualitatively as follows:

In the first stage of the process, which ends with the effluent gas having been exposed to both the warm liquid droplets 16 emitted by the nozzle array 18 and the steam emitted from steam nozzles 30, the effluent gas will have been brought to or near water vapor saturation at a relatively high temperature $T_1$.

In the second stage, consider the effects which occur when the effluent gas is exposed to the cool liquid droplets 34 emitted from nozzle array 36:

Thermo-Phoretic Effect

Because the effluent gas has entered the second stage at a higher temperature $T_1$, higher than the cooler temperature $T_2$ of the cool liquid droplets 34, around each of the cool liquid droplets 34 there will be a thermal gradient, directed away from the droplet, i.e. directed away from the cooler temperature $T_2$ of the droplet toward the region of higher temperature, approaching the temperature $T_1$ far enough away from the droplet.

A particulate near enough to one of the cool liquid droplets 34 to experience this temperature gradient, will experience unbalanced thermal molecular bombardment by the molecules of the effluent gas, due to this temperature gradient: the side of the particulate facing away from the liquid droplet 34 will be struck by effluent gas molecules having a higher median velocity, than will the side of the particulate facing the liquid droplet 34.

The result is a net force, the thermo-phoretic force, which urges the particulate in the direction of the liquid droplet 34, i.e. in the direction opposite the temperature gradient direction.

Diffusio-Phoretic Effect

Because the effluent gas has been brought to or near water vapor saturation in the first stage of the process, the cool liquid droplets 34 absorb water vapor from the effluent gas. As a result, there is a gradient of the water vapor concentration, directed in the direction of increasing water vapor concentration, i.e. away from each of the cool liquid droplets 34 toward the surrounding effluent gas, because the water vapor concentration is depleted adjacent to each of the absorbing cool liquid droplets 34.

So, a particulate near enough to one of the cool liquid droplets 34 to experience this gradient of water vapor concentration, will experience uneven bombardment by water molecules in the effluent gas. The side of the particulate facing away from the liquid droplet 34 will be struck by more water molecules per unit time, than the side facing the droplet 34. The result is a net force, the diffusio-phoretic force, which urges the particulate in the direction of the droplet 34, i.e. in the direction opposite to the gradient of water vapor concentration.

Condensation Effect

As a particulate approaches one of the cool liquid droplets 34, the droplet creates a "sphere of influence" extending about one droplet diameter from the droplet surface, within which the effluent gas is super-saturated with water vapor. This may readily be seen, as follows: Assume that the gradient of the water vapor concentration and the temperature gradient are both constant near the cool liquid droplet 34, as is believed to be the case, though the exact conditions very near the droplet are not known with certainty. Assuming the constant gradients, the water vapor concentration and temperature each increase linearly with distance from the droplet surface. Referring to the psychometric chart, FIG. 2, and assuming that the gas at some distance from the droplet is at 110 deg. Fahrenheit, the figure shows that the water vapor concentration at that point (call it Point 1) would be about 61 grams of water vapor per kilogram of dry air. Due to the linearity of the temperature and water vapor concentrations, the state of the gas in the region from Point 1 to the surface of the cool droplet (Point $T_2$ on the psychometric chart, FIG. 2), can be represented by a straight line on FIG. 2 connecting Point 1 to Point $T_2$. Since this line lies above the 100% relative humidity curve on FIG. 2, the particulate will be subject to supersaturation conditions as it moves from Point 1 toward the droplet 34, assuming the particulate maintains the same temperature as the immediately surrounding gas during such motion.

The particulates within this sphere of influence act as condensation nuclei for the super-saturated water vapor, and begin growing from water condensation onto the particulate surfaces. By this process, a particulate of a diameter as small as 0.01 micron can grow to a size of 0.3 micron in the few milliseconds which the particulate spends within the sphere of influence, according to applicant's calculations.

If the cool liquid droplet 34 carries an electrical charge sufficient to yield an appreciable monopole-dipole attractive force between the droplet and the particulate absorbing the water vapor, as taught in applicant's U.S. Pat. No. 6,156,098, then that attractive force will grow rapidly as the particulate grows through water absorption, since the monopole-dipole force varies as the cube of the particulate size. *Electromaqnetic Fields* by R. K. Wangsness (J. Wiley, 2d ed. 1986) at pp. 128, 194. Of course if the particulates have electric charge, and the cool liquid droplets 34 have opposite charge polarity, the attractive forces between the particulates and the droplets 34 will be further enhanced.

The processes described above may be better understood with reference to the psychometric chart, FIG. 2, in which the sub-saturated portion of the chart is divided into four regions A, B, C and D. For illustrative purposes, the chart is restricted to the 50 to 150 deg. Fahrenheit range, and the temperature $T_2$ of the cool liquid droplets 34 has been arbitrarily chosen to be 87 deg. Fahrenheit. The line separating Region A and Region B is a line drawn tangent to the 100% relative humidity curve at the temperature $T_2$, 87 deg. Fahrenheit. The line separating Region B from Region C is a line of constant mixing ratio, also drawn through the same point; and the line separating Region C from Region D is a line of constant temperature, also drawn through the same point.

The process of the present invention is most efficient in removing particulates in the size range of most interest, the 0.01 micron to 0.1 micron diameter size range, if the effluent gas in stage 1 has a temperature $T_1$ and a relative humidity $RH_1$ in region A of the psychometric chart, FIG. 2, as the gas enters stage 2. Applicant's test results indicate that for this situation all of the processes discussed above are positive in the effect on collection of the particulates by the cool liquid droplets 34 in stage 2, and that the process is more effective the higher the values of $RH_1$ and $T_1$. This is reasonable since the diffusio-phoretic force is proportional to the magnitude of the gradient of the temperature near the cool liquid droplet 34. Thus the greater $RH_1$ is, the greater the magnitude of the gradient of the water vapor concentration near the cool droplet 34 (likewise for $T_1$). The growth by condensation occurs because, as explained above, the particulate passes through a region of supersaturation as it approaches the cool droplet 34.

If however, the effluent gas leaves stage 1 while in Region B of the psychometric chart, FIG. 2, then the thermo-phoretic effect and the diffusio-phoretic effect are positive, but the condensation effect is neutral. This is reasonable since the growth by condensation does not occur, because the particulate does not pass through a region of supersaturation as it approaches the cool liquid droplet 34.

If the effluent gas leaves stage 1 while in Region C of the psychometric chart, FIG. 2, then the thermo-phoretic effect is positive, the diffusio-phoretic effect is negative, and the condensation effect is neutral. This is reasonable since the growth by condensation does not occur, because the particulate does not pass through a region of supersaturation as it approaches the cool liquid droplet 34. The thermo-phoretic effect is still positive because $T_1$ is greater than $T_2$. The diffusio-phoretic effect is negative because $RH_1$ is now less than 100%.

If the effluent gas leaves stage 1 while in region D of the psychometric chart, FIG. 2, then the thermo-phoretic effect is negative, the diffusio-phoretic effect is negative, and the condensation effect is neutral. This is reasonable since the growth by condensation does not occur, since the particulate does not pass through a region of supersaturation as it approaches the cool liquid droplet 34. The thermo-phoretic effect is negative because $T_1$ is now less than $T_2$. The diffusio-phoretic effect is negative because $RH_1$ is still less than 100%.

Optimum Operating Parameters

Applicant's tests of the present invention process, and applicant's calculations, together indicate that optimal collection efficiency for particulates in the 0.01 micron to 0.1 micron diameter size range is attained by the following combination of operating parameters:

1. The relative humidity $RH_1$ reached by the effluent gas in stage 1 should exceed 95%;
2. The temperature difference $T_1-T_2$ should be at least 15 deg. Fahrenheit, so that $T_1$ would be at least 102 deg. Fahrenheit in the example of the psychometric chart, FIG. 2;
3. The mass flow rate of the cool liquid droplets 34 in stage 2 should at least equal the mass flow rate of the effluent gas being cleaned by the process;
4. The cool liquid droplets 34 in stage 2 should have an average diameter no larger than 200 microns;
5. The cool liquid droplets 34 should each bear an electrical charge having a magnitude which is at least an appreciable portion of the theoretical maximum charge such a droplet may carry;
6. The travel time of the effluent gas through the cool liquid droplets 34 should be at least 2 seconds; and
7. There should be opposite electric charge polarity of the particulates and the cool liquid droplets 34.

On Producing Highly Charged Droplets 34

Even if the particulates contained in the effluent gas are uncharged, applicant's U.S. Pat. No. 6,156,098 teaches that such uncharged particulates may be effectively collected by exposure to copious quantities of very highly charged liquid droplets, through use of the monopole-dipole attractive forces between the highly charged droplets and the electric dipoles induced in the uncharged particulates by the monopole electric fields of the droplets. The patent discloses specific means for producing such highly charged droplets and using said droplets in the collection of such uncharged particulates, and the disclosures of applicant's U.S. Pat. No. 6,156,098 are incorporated herein by this reference, at Col. 3, line 8-Col. 13, line 30, and FIGS. 1 through 5b, for purposes of enabling one skilled in the art to use such very highly charged droplets for the cool liquid droplets 34 in the present invention process and apparatus.

Test Results

A 2000 cfm model working with a gas saturated with water vapor at 80 deg. F in chamber 1 reduced the opacity of a sub-micron (<1 micron) exhaust plume from about 20% to 10% when the liquid in chamber 2 was reduced from 80 deg. F to 65 deg. F. The opacity of the exhaust plume was reduced to 0 when electrically charged droplets were used in chamber 2. From applicant's other tests, applicant believes that most of the particulates in the exhaust plumes were of less than 0.1 micron diameter.

Some Possible Variations of Embodiments

Those familiar with the art will appreciate that the invention may be employed in a wide variety of configurations without departing from the essential substance thereof.

For example, and not by way of limitation, depending upon the contaminant particulates and contaminant gases to be collected, including both contaminant composition and particulate size range of interest in a particular application, it will often be possible to obtain useful results with operating parameters which do not fully fit the optimum operating parameters specified above.

So, for example, useful results may be obtained with cool liquid droplets 34 which are uncharged, so that neither monopole—monopole nor monopole-dipole electrostatic forces operate between the droplets 34 and the particulates. Useful results may nonetheless be obtained since the thermo-phoretic effect, the diffusio-phoretic effect and the condensation effect may nonetheless operate to achieve satisfactory particulate collection, even absent the electrostatic attractive forces, though not as efficiently as with the presence of the electrostatic attractive forces.

Similarly, where the droplets 34 are highly charged, useful results may be obtained even with uncharged particulates, since the monopole-dipole attractive forces then operate between the droplets and the uncharged particulates, in addition to the other effects.

Figure 2:
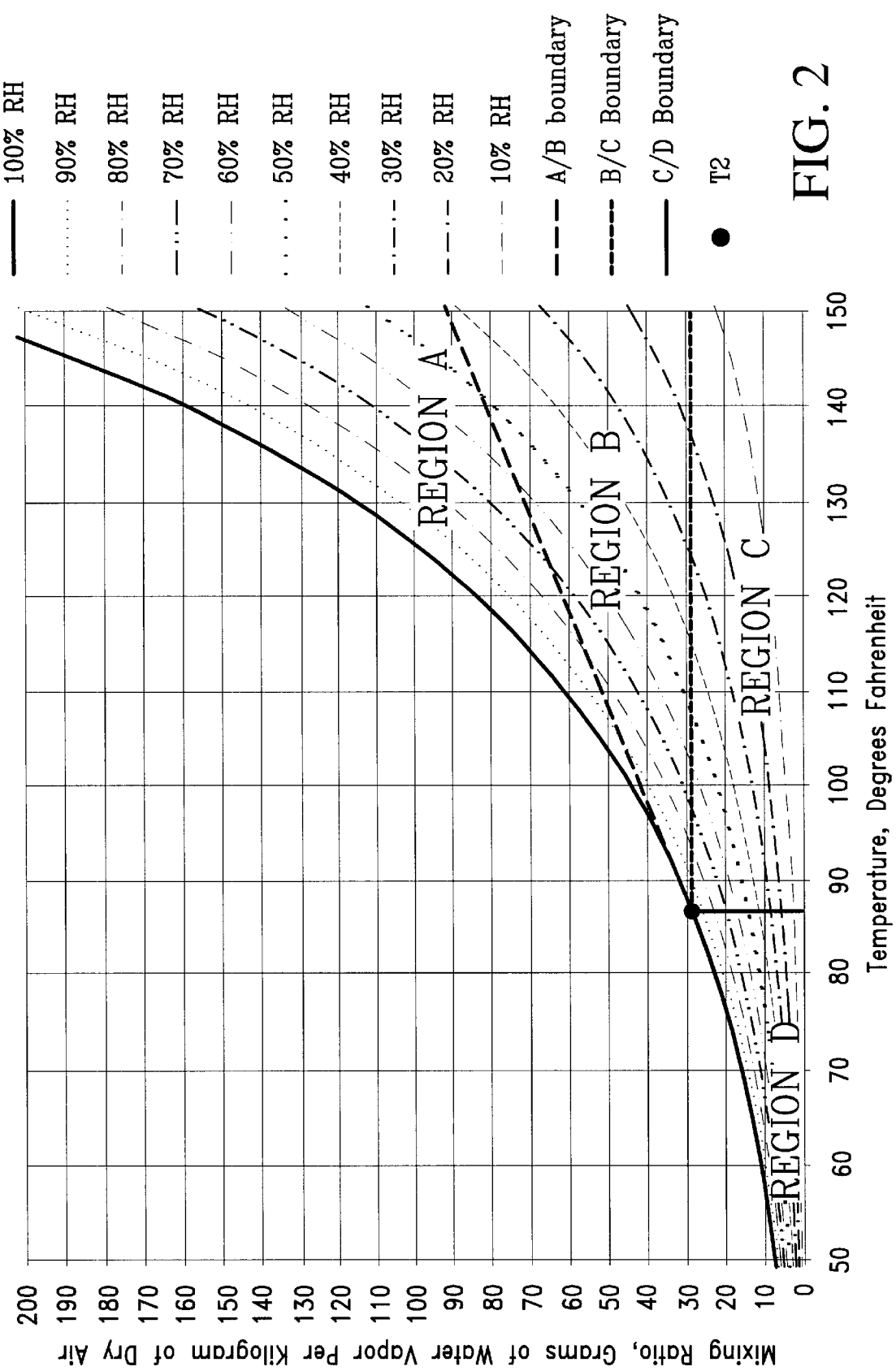
FIG. 2 is a psychometric chart showing the various possible operating regions involved in the process.

And even if the operating parameters do not present an effluent gas state, leaving stage 1, which lies in the preferred Region A of the psychometric chart, FIG. 2, but rather in region B, where both the thermo-phoretic effect and the diffusio-phoretic effect are positive for particulate collection in stage 2, though the condensation effect is neutral, useful results may be obtained.

However Region C should generally be avoided since the diffusio-phoretic effect will be negative for that region, and the diffusion effect neutral. Region D should also be avoided, since, as noted above, both the thermo-phoretic effect and the diffusio-phoretic effect are negative, and the condensation effect is neutral, for region D.

Those skilled in the art may readily, without undue experimentation, determine the effect on collection efficiency for collection of particular contaminant gases and particulates, of varying any one of the operating parameters from the optimum set of operating parameters set out above, by simply comparing collection efficiency obtained with the changed operating parameter and with the other parameters being left at the optimal states, on the one hand, with the collection efficiency obtained on the other hand when all operating parameters comply with the optimum set.

Use of the present invention process is of course not limited to the particular apparatus illustrated in FIG. 1. For example, the water in sump 20 could be at the wet bulb temperature, with no heat exchange coils 26, and with steam and hot liquid both being injected at the site of the steam nozzles 30; or one might employ a more strongly heated sump 20 with no steam injection at the steam nozzles 30. However, use of the steam nozzles 30 is often practical, for applications in which waste steam is readily available and cheap (if not free).

And, one might employ alternate methods for heating the sump and cooling the sump 38.

One may also possibly employ a liquid other than water as the operational fluid in the sump 20 and sump 38 from whence the liquid droplets 16 and cool liquid droplets 34 are generated. If one employs a liquid other than water, the term "relative humidity" in the invention disclosure and claims would be understood to refer to the percentage of saturation of the effluent gas with the vapor of said other liquid.

One might also employ water-based solutions, tailored to make the particulates more soluble, or more attached to the surface of the drops. Examples of such solutions would be detergents, soaps, or other surfactants and chemicals.

The scope of the invention is defined by the following claims, including also all subject matter encompassed by the doctrine of equivalents as applicable to the claims.

I claim:

1. Process for cleaning contaminant gases and contaminant particulates from a flowing effluent gas, comprising the steps of:
   (a) bringing said effluent gas, in a first stage, to a temperature $T_1$ and a relative humidity $RH_1$; and
   (b) exposing said effluent gas, in a second stage, to copious quantities of cool liquid droplets having a temperature $T_2$; where
      said process has operating parameters sufficiently close to the following optimal operating parameters:
      (1) The relative humidity $RH_1$ in said first stage exceeds 95%;
      (2) The temperature difference $T_1-T_2$ is at least 15 deg. Fahrenheit;
      (3) The mass flow rate of the cool liquid droplets in said second stage at least equals the mass flow rate of the effluent gas being cleaned by said process;
      (4) The cool liquid droplets in said second stage have an average diameter no larger than 200 microns;
      (5) The cool liquid droplets in said second stage each bear an electrical charge having a magnitude which is at least an appreciable portion of the theoretical maximum charge such a droplet may carry;
      (6) The travel time of said effluent gas through the cool liquid droplets in said second stage is at least 2 seconds; and
      (7) Said particulates and said cool liquid droplets in said second stage have opposite electric charge polarity;
   to achieve a desired collection efficiency for removal of said contaminants from said effluent gas, for particulates of the size range of interest to an operator of said process.

2. Process for cleaning contaminant gases and contaminant particulates from a flowing effluent gas, comprising the steps of:

(a) bringing said effluent gas, in a first stage, to a temperature $T_1$ and a relative humidity $RH_1$; and
(b) exposing said effluent gas, in a second stage, to copious quantities of cool liquid droplets having a temperature $T_2$; where
said process has operating parameters each at least substantially complying with the following optimal operating parameters:
(1) The relative humidity $RH_1$ in said first stage exceeds 95%;
(2) The temperature difference $T_1-T_2$ is at least 15 deg. Fahrenheit;
(3) The mass flow rate of the cool liquid droplets in said second stage at least equals the mass flow rate of the effluent gas being cleaned by said process;
(4) The cool liquid droplets in said second stage have an average diameter no larger than 200 microns;
(5) The cool liquid droplets in said second stage each bear an electrical charge having a magnitude which is at least an appreciable portion of the theoretical maximum charge such a droplet may carry;
(6) The travel time of said effluent gas through the cool liquid droplets in said second stage is at least 2 seconds; and
(7) Said particulates and said cool liquid droplets in said second stage have opposite electric charge polarity.

3. Process of claim 2, wherein said process has operating parameters fully complying with said optimal operating parameters.

4. Process for cleaning contaminant gases and contaminant particulates from a flowing effluent gas, comprising the steps of:
(a) bringing said effluent gas, in a first stage, to a temperature $T_1$ and a relative humidity $RH_1$; and
(b) exposing said effluent gas, in a second stage, to copious quantities of cool liquid droplets having a temperature $T_2$; where
said process has operating parameters each at least substantially complying with the following operating parameters:
(1) The relative humidity $RH_1$ in said first stage exceeds 95%;
(2) The temperature difference $T_1-T_2$ is at least 15 deg. Fahrenheit;
(3) The mass flow rate of the cool liquid droplets in said second stage at least equals the mass flow rate of the effluent gas being cleaned by said process;
(4) The cool liquid droplets in said second stage have an average diameter no larger than 200 microns; and
(5) The travel time of said effluent gas through the cool liquid droplets in said second stage is at least 2 seconds.

5. Process of claim 4, wherein said process has operating parameters fully complying with said operational parameters listed in said claim.

6. Process for cleaning contaminant gases and contaminant particulates from a flowing effluent gas, comprising the steps of:
(a) bringing said effluent gas, in a first stage, to a temperature $T_1$ and a relative humidity $RH_1$; and
(b) exposing said effluent gas, in a second stage, to copious quantities of cool liquid droplets having a temperature $T_2$; where
said process has operating parameters sufficiently close to the following operating parameters:
(1) The relative humidity $RH_1$ in said first stage exceeds 95%;
(2) The temperature difference $T_1-T_2$ is at least 15 deg. Fahrenheit;
(3) The mass flow rate of the cool liquid droplets in said second stage at least equals the mass flow rate of the effluent gas being cleaned by said process;
(4) The cool liquid droplets in said second stage have an average diameter no larger than 200 microns;
(5) The cool liquid droplets in said second stage each bear an electrical charge having a magnitude which is at least an appreciable portion of the theoretical maximum charge such a droplet may carry; and
(6) The travel time of said effluent gas through the cool liquid droplets in said second stage is at least 2 seconds;
to achieve a desired collection efficiency for removal of said contaminants from said effluent gas, for particulates of the size range of interest to an operator of said process.

7. Process for cleaning contaminant gases and contaminant particulates from a flowing effluent gas, comprising the steps of:
(a) bringing said effluent gas, in a first stage, to a temperature $T_1$ and a relative humidity $RH_1$; and
(b) exposing said effluent gas, in a second stage, to copious quantities of cool liquid droplets having a temperature $T_2$; where
said process has operating parameters each at least substantially complying to the following operating parameters:
(1) The relative humidity $RH_1$ in said first stage exceeds 95%;
(2) The temperature difference $T_1-T_2$ is at least 15 deg. Fahrenheit;
(3) The mass flow rate of the cool liquid droplets in said second stage at least equals the mass flow rate of the effluent gas being cleaned by said process;
(4) The cool liquid droplets in said second stage have an average diameter no larger than 200 microns;
(5) The cool liquid droplets in said second stage each bear an electrical charge having a magnitude which is at least an appreciable portion of the theoretical maximum charge such a droplet may carry; and
(6) The travel time of said effluent gas through the cool liquid droplets in said second stage is at least 2 seconds.

8. Process of claim 1, wherein water is used to create said relative humidity $RH_1$ in said first stage and to form said cool liquid droplets in said second stage.

9. Process of claim 1, wherein said cool liquid droplets in said second stage each bear an electric charge having a magnitude which is at least 1% of the theoretical maximum charge such a droplet may carry.

10. Process of claim 9, wherein said cool liquid droplets in said second stage each bear an electric charge having a magnitude which is at least 10% of the theoretical maximum charge such a droplet may carry.

11. Process of claim 10, wherein said cool liquid droplets in said second stage each bear an electric charge having a magnitude which is at least 50% of the theoretical maximum charge such a droplet may carry.

12. Process of claim 2, wherein said cool liquid droplets in said second stage each bear an electric charge having a magnitude which is at least 1% of the theoretical maximum charge such a droplet may carry.

13. Process of claim 12, wherein said cool liquid droplets in said second stage each bear an electric charge having a magnitude which is at least 10% of the theoretical maximum charge such a droplet may carry.

14. Process of claim 12, wherein said cool liquid droplets in said second stage each bear an electric charge having a magnitude which is at least 50% of the theoretical maximum charge such a droplet may carry.

15. Process of claim 3, wherein said cool liquid droplets in said second stage each bear an electric charge having a magnitude which is at least 1% of the theoretical maximum charge such a droplet may carry.

16. Process of claim 15, wherein said cool liquid droplets in said second stage each bear an electric charge having a magnitude which is at least 10% of the theoretical maximum charge such a droplet may carry.

17. Process of claim 15, wherein said cool liquid droplets in said second stage each bear an electric charge having a magnitude which is at least 50% of the theoretical maximum charge such a droplet may carry.

18. Apparatus for cleaning contaminant gases and contaminant particulates from a flowing effluent gas, comprising:
   (a) a first stage of said apparatus comprising at least one chamber receiving said flowing effluent gas, said first stage further comprising means to bring said effluent gas to a temperature $T_1$ and a relative humidity $RH_1$; and
   (b) a second stage of said apparatus, connected to said first stage of said apparatus, said second stage comprising at least one chamber receiving said flowing effluent gas from said first stage of said apparatus, said second stage further comprising means to expose said effluent gas to copious quantities of cool liquid droplets having a temperature $T_2$; where said apparatus has operating parameters sufficiently close to the following optimal operating parameters:
   (1) The relative humidity $RH_1$ in said first stage exceeds 95%;
   (2) The temperature difference $T_1-T_2$ is at least 15 deg. Fahrenheit;
   (3) The mass flow rate of the cool liquid droplets in said second stage at least equals the mass flow rate of the effluent gas being cleaned by said process;
   (4) The cool liquid droplets in said second stage have an average diameter no larger than 200 microns;
   (5) The cool liquid droplets in said second stage each bear an electrical charge having a magnitude which is at least an appreciable portion of the theoretical maximum charge such a droplet may carry;
   (6) The travel time of said effluent gas through the cool liquid droplets in said second stage is at least 2 seconds; and
   (7) Said particulates and said cool liquid droplets in said second stage have opposite electric charge polarity;
   to achieve a desired collection efficiency for removal of said contaminants from said effluent gas, for particulates of the size range of interest to an operator of said process.

19. Apparatus for cleaning contaminant gases and contaminant particulates from a flowing effluent gas, comprising:
   (a) a first stage of said apparatus comprising at least one chamber receiving said flowing effluent gas, said first stage further comprising means to bring said effluent gas to a temperature $T_1$ and a relative humidity $RH_1$; and
   (b) a second stage of said apparatus, connected to said first stage of said apparatus, said second stage comprising at least one chamber receiving said flowing effluent gas from said first stage of said apparatus, said second stage further comprising means to expose said effluent gas to copious quantities of cool liquid droplets having a temperature $T_2$; where said apparatus has operating parameters at least substantially complying with the following optimal operating parameters:
   (1) The relative humidity $RH_1$ in said first stage exceeds 95%;
   (2) The temperature difference $T_1-T_2$ is at least 15 deg. Fahrenheit;
   (3) The mass flow rate of the cool liquid droplets in said second stage at least equals the mass flow rate of the effluent gas being cleaned by said process;
   (4) The cool liquid droplets in said second stage have an average diameter no larger than 200 microns;
   (5) The cool liquid droplets in said second stage each bear an electrical charge having a magnitude which is at least an appreciable portion of the theoretical maximum charge such a droplet may carry;
   (6) The travel time of said effluent gas through the cool liquid droplets in said second stage is at least 2 seconds; and
   (7) Said particulates and said cool liquid droplets in said second stage have opposite electric charge polarity.

20. Apparatus of claim 19, wherein said operating parameters fully comply with said optimal operating parameters.

* * * * *